United States Patent [19]

D'Aniello, Jr. et al.

[11] Patent Number: 4,548,911

[45] Date of Patent: Oct. 22, 1985

[54] REGENERATION OF PHOSPHORUS POISONED AUTOMOTIVE CATALYSTS

[75] Inventors: Michael J. D'Aniello, Jr., Rochester; David R. Monroe, Bloomfield Hills; Martin H. Krueger, Roseville, all of Mich.

[73] Assignee: General Motors Corporation, Detroit, Mich.

[21] Appl. No.: 661,945

[22] Filed: Oct. 17, 1984

[51] Int. Cl.$^4$ ............................................. B01J 23/96
[52] U.S. Cl. ................................... 502/28; 423/213.5; 502/27; 502/515; 502/517
[58] Field of Search ..................... 502/27, 28, 24, 515, 502/516, 517; 423/213.5

[56] References Cited

U.S. PATENT DOCUMENTS

| | | | |
|---|---|---|---|
| 2,006,221 | 6/1935 | Ridler | 502/28 |
| 2,867,497 | 1/1959 | Houdry et al. | 502/27 |
| 4,152,301 | 5/1979 | Summers et al. | 423/213.5 |

FOREIGN PATENT DOCUMENTS

| | | | |
|---|---|---|---|
| 54-51991 | 4/1979 | Japan | 502/27 |

*Primary Examiner*—P. E. Konopka
*Attorney, Agent, or Firm*—George A. Grove

[57] ABSTRACT

Regeneration of a phosphorus poisoned automotive exhaust catalyst is accomplished in a preferred embodiment by washing the catalyst or soaking it to the point of incipient wetness with an aqueous solution of an acid such as HCl, HNO$_3$ or oxalic acid and subsequent heating of the wetted catalyst in air or other oxygen-containing gas.

4 Claims, No Drawings ically.
REGENERATION OF PHOSPHORUS POISONED AUTOMOTIVE CATALYSTS

This invention relates to a method of restoring the activity of an automotive exhaust gas treatment catalyst that has been poisoned by phosphorus.

BACKGROUND

Catalysts are employed on automobiles to treat engine exhaust gases to convert unburned hydrocarbons and carbon monoxide to carbon dioxide and water and to convert nitrogen oxides to nitrogen and water. Typically the catalysts comprise one or more noble metals such as platinum, palladium and rhodium in an extremely fine dispersion on a high surface area material such as gamma alumina. Such high surface area carrier may be in the form of an alumina pellet. In this case, the exhaust gas treatment is effected by retaining a bed of pellets in a suitable metal container which is shaped to direct the exhaust gas through the bed. In another arrangement, an extruded monolithic ceramic body is formed containing a large number of longitudinal open ended passages. The body is of a refractory material such as cordierite. In this arrangement, the noble metal is dispersed on an alumina washcoat which in turn is carried by the cordierite body.

It is known that certain elements such as lead or phosphorus if allowed to accumulate on the surface of the catalyst will drastically reduce its ability (activity) to treat the exhaust gas as intended. For this reason, there are restrictions on the amount of lead or phosphorus that are added to engine fuels. However, phosphorus is still employed in lubricating oils. When oil is consumed in the engine, phosphorus can be deposited on the surface of the catalyst, inhibiting its activity. The exact chemical form of the deposited phosphorus may not be known. It is likely that the major phosphorus-containing poisons, in the absence of significant amounts of lead, consist of complex mixtures of metal phosphates and hydroxyphosphates in varying degrees of hydration and crystallinity. These phosphorus-containing materials seem to glaze over the surface of the catalyst, preventing the noble metal from interacting with the exhaust gas.

It is an object of our invention to provide a simple method of rejuvenating a phosphorus poisoned automotive exhaust treatment catalyst. It is a further object of the invention to provide such a method of treating and rejuvenating a phosphorus poisoned catalyst with a suitable acid solution that could be carried out by a mechanic in a garage.

BRIEF SUMMARY

In accordance with a preferred embodiment of our invention, these and other objects and advantages are accomplished as follows.

A catalyst whose activity to oxidize hydrocarbons and carbon monoxide and to reduce NOx has been diminished because of phosphorus poisoning is treated with a solution of an acid. The treatment may be in the form of one or more washes of the catalyst with a hot acid solution or it may be in the form of filling the pores of the catalyst with the solution to the point of incipient wetness. Suitably an aqueous solution of hydrochloric acid or nitric acid may be used. However, for reasons which will be stated, we prefer to use an aqueous solution (about 1 molar in concentration) of oxalic acid or malonic acid or other suitable dibasic organic acid. The monolithic catalyst body or the catalyst pellets are thoroughly soaked with the acid solution. An abundance of hot solution may be employed to submerge and thoroughly wash the catalyst body. In this case, the hot wash dissolves the phosphorus-containing material. However, it is also suitable to use just that amount of acid solution required to just fill the pores of the catalyst material. This is termed the "incipient wetness treatment." Here the treatment with acid solution may be at normal room temperature or warmer. The acid solution remains in contact with the catalyst until equilibrium is reached. As a practical matter, the wetted catalyst is allowed to stand for about 30 minutes.

If the poisoned catalyst has been treated by washing with acid, the excess solution is drained from the catalyst. In either treatment the catalyst is then heated in flowing air or other oxygen-containing gas such as automotive exhaust gas to evaporate the solvent and drive off the acid. Suitably, in the heating, the catalyst reaches a temperature of about 500° C. or so for a period of a couple of hours. Either treatment, by washing or by incipient wetness, surprisingly, rejuvenates the catalyst. Washing appears to remove the phosphorus or phosphorus-containing species. Acid treatment to incipient wetness redistributes the phosphorus so that it is not harmful to catalyst performance. So long as a suitable acid is used under suitable treatment conditions, neither treatment redistributes or adversely affects the catalyst particles on the beads or monolith.

Both aqueous mineral acid and aqueous solutions of dibasic organic solutions are effective in the exhaust catalyst rejuvenation. Treatment with the inorganic mineral acids may be less expensive, but high temperature removal of the acids can create a corrosive atmosphere which may be undesirable depending on where the treatment is conducted. If the treatment is to be carried out in a garage or without removing the catalyst from its normal container, it may be preferred to use a dibasic organic acid such as oxalic acid. Heating of an oxalic acid wetted catalyst in an oxygen-containing gas stream decomposes the acid into carbon dioxide and water, which are usually innocuous byproducts.

Other objects and advantages of our invention will be better appreciated from a detailed description thereof which follows.

DETAILED DESCRIPTION

Samples of fresh pellet-type automotive exhaust treatment catalysts were obtained and tested to obtain base line data. The catalyst was that used on vehicles of General Motors manufacture and contained a dispersion of palladium and platinum on alumina beads. A 5 gram sample of the fresh catalyst was tested in a laboratory quartz tube reactor using a gas flow rate of 9 l/min (a space velocity of 50,000 $h^{-1}$ at 1 atmosphere and 20° C.). The reactor feed contained, by volume, 1% oxygen, 0.77% carbon monoxide, 0.2% hydrogen, 10% water, 10% carbon dioxide, 500 ppm nitrogen oxide, 300 ppm propylene, 20 ppm sulfur dioxide and the balance nitrogen. The reactor temperature was initially 200° C. and was increased to 500° C. at a rate of 5° C. per minute. The degree of conversion of hydrocarbon (HC) and carbon monoxide (CO) of the fresh catalyst measured at 500° C. under steady state conditions was 98.2% for hydrocarbon and substantially 100% for carbon monoxide. With no catalyst in the quartz tube, the HC and CO conversions were 8% and 5% respectively at 500° C. This blank conversion did not change in the course of the experiments, which will be described below.

A sample of the same type of catalyst which had been used in an operating vehicle over 36,900 miles was obtained. The catalyst sample was examined and observed to contain a significant amount of phosphorus. Its activity for conversion of HC and CO was measured in a laboratory tubular reactor as described above. Its conversion efficiency at 500° C. under steady state was only 55.0% for HC and 65.6% for CO. The reduction in conversion efficiency of the catalyst for both HC and CO seems to be a characteristic of phosphorus poisoning. In contrast, lead poisoning primarily affects HC conversion efficiency.

As outlined above, such a phosphorus poisoned catalyst can be treated with acid solution in different ways. The catalyst may be totally immersed and washed in acid solution or it may be soaked with just sufficient acid solution to fill the pores of the catalyst with no visible solution left over—i.e., to the point of incipient wetness. In washing, it is preferred that the catalyst pellets or monolithic body is submerged in a warm or nearly boiling aqueous solution of the acid. By washing in a suitable hot acid solution, it is usually possible to dissolve and remove most of the poisonous phosphorus-containing species from the catalyst body. However, in the incipient wetness technique, it is usually sufficient to initially treat with a solution at room temperature. In this approach the phosphorus is not removed from the catalyst body; it is redistributed on the body so that it does not interfere with the catalyst particles. Contact with the acid solution and/or heating of the acid solution-containing catalyst to remove the acid brings about the phosphorus redistribution before the acid is driven off the catalyst body.

In either treatment the catalyst is suitably allowed to remain in contact with the acid solution for 30 minutes, which is deemed sufficient for the acid and phosphorus-containing species to reach an equilibrium.

If the catalyst has been submerged and washed in hot acid, the extraneous solution is drained off and the wet catalyst is heated. If the catalyst has been treated to incipient wetness, it is permitted to stand and is then heated. In each case, the heating is carried out slowly so as to first evaporate the water and drive off or decompose the acid. Our typical practice was to then further heat the body to 500° C. in air and calcine it at that temperature for about two hours.

We treated samples of the above described phosphorus poisoned catalyst pellets with various acids in aqueous solution at room temperature using the incipient wetness procedure. A ten gram sample of catalyst was treated with 6.5 ml of solution. The pellets were allowed to stand for 30 minutes and then loaded into a quartz tube furnace (as described above) at room temperature. Air flow was established and the furnace, preset at 500° C., was turned on. A thermocouple placed in the center of the catalyst bed was used to follow the temperature of the sample. With our furnace and a 10g sample of wet oxalic acid treated catalyst, the temperature rose to 100° C. in 5 minutes and remained there for 11 minutes while water evaporated from the sample. The temperature then rose to 500° C. over a period of 20 minutes and was held there for two hours. The HC and CO conversion efficiency was measured. The result of this testing is summarized below. The conversion efficiency of the fresh catalyst and untreated aged catalyst are included for comparison.

TABLE I

| Reagent | % Conversion Hydrocarbon | CO |
| --- | --- | --- |
| none - fresh catalyst | 98.2 | 100 |
| none - aged catalyst | 55.0 | 65.6 |
| concentrated hydrochloric acid | 93.3 | 93.5 |
| concentrated nitric acid | 91.8 | 93.5 |
| concentrated hydrochloric/ nitric acids (3/1) | 83.3 | 80.0 |
| aqueous oxalic acid (ca. 1 M) | 95.3 | 97.4 |

It is seen that treatment of a phosphorus poisoned catalyst with hydrochloric acid or nitric acid or oxalic acid in accordance with our invention substantially increases the HC and CO conversion efficiency of the catalyst. In fact, most of the original activity was regained. Treatment with aqua regia (a mixture of concentrated hydrochloric and nitric acids) also increases the catalytic activity of the phosphorus poisoned catalyst but to a lesser degree than the individual acids. Aqua regia is known to dissolve platinum and palladium and may have adversely affected the placement of these noble metals on the catalyst beads.

Improvements of similar or greater degree are also obtained by one or more washings of the catalyst with hot concentrated nitric acid, hot concentrated hydrochloric acid (both acids in concentrations as obtained commercially and at 85° to 90° C.) or hot aqueous malonic or oxalic acid at about 65° C. Preferably the wash is carried out above ambient temperature but below the boiling point of the solution, e.g., 50° to 90° C. It is also generally preferred that only one mineral acid be employed in a hot treatment solution to minimize redistribution of the catalyst. The respective catalyst samples were drained, dried, calcined and evaluated as described.

We then analyzed and rejuvenated a number of customer aged General Motors pellet type oxidation catalysts. Table II summarizes the converter designation number; mileage; and phosphorus, lead, zinc, platinum and palladium contents of the respective catalyst samples. Table II also summarizes the HC and CO conversion efficiencies of the poison catalysts as received. These conversion efficiencies were determined in the above-described laboratory tubular reactor and synthetic exhaust gas was measured at steady state at 500° C. The listed data in Table II is the HC and CO conversion efficiencies of rejuvenated portions of the respective catalysts. We treated samples from each converter by a single step incipient wetness treatment with 1M oxalic acid for 30 minutes followed by a two hour calcination at 500° C. in flowing air.

TABLE II

| Converter | Mileage | % P | % Pb | % Zn | % Pt | % Pd | As Received HC | CO | Rejuvenated HC | CO |
| --- | --- | --- | --- | --- | --- | --- | --- | --- | --- | --- |
| 50143 | 38700 | 0.094 | 0.083 | 0.064 | 0.038 | 0.013 | 68% | 75% | 92% | 95% |
| 50144 | 33400 | 0.085 | 0.063 | 0.037 | 0.040 | 0.014 | 71% | 78% | 93% | 97% |
| 50145 | 36900 | 0.116 | 0.191 | 0.073 | 0.038 | 0.014 | 56% | 64% | 82% | 89% |

TABLE II-continued

| Converter | Mileage | % P | % Pb | % Zn | % Pt | % Pd | As Received HC | As Received CO | Rejuvenated HC | Rejuvenated CO |
|---|---|---|---|---|---|---|---|---|---|---|
| 50147 | 24400 | 0.047 | 0.061 | 0.023 | 0.039 | 0.014 | 77% | 84% | 91% | 95% |
| 50149 | 57400 | 0.153 | 0.237 | 0.062 | 0.036 | 0.012 | 28% | 36% | 88% | 92% |
| C-018 | 49700 | 0.071 | 0.271 | 0.047 | 0.036 | 0.012 | 52% | 62% | 79% | 84% |

It is seen that in each instance our practice produces a marked improvement in the HC and CO conversion efficiencies of the catalyst as measured under the stated conditions. Furthermore, the HC and CO conversion efficiencies of the oxalic acid treated catalyst were greater than the respective efficiencies of the as-received catalysts at catalyst operating temperatures of 325° C. and higher.

The rejuvenation technique was also tested on a full 260 cubic inch converter of catalyst pellets. The converter had been operated on a vehicle for 66,000 miles. As received, it displayed mild symptoms of phosphorus poisoning on actual engine tests at an air-fuel ratio of 15 to 1. With an exhaust temperature of 540° C., the HC conversion was 76% and CO was 98%. The pellets were then removed from the converter and treated to incipient wetness with 1M aqueous oxalic acid (about 2 liters required) in a bucket. The catalyst was treated outside of the converter to be sure that there was good distribution of the regeneration solution. The wetted catalyst was replaced in the converter and installed on the dynamometer. The engine was started, allowed to idle for about 15 minutes and then run at 1800 rpm for one hour to stabilize the equipment before testing. During this operation, the catalyst was calcined by the oxygen-containing exhaust gas. The regenerated converter displayed an HC conversion efficiency of 89% and the CO conversion efficiency was 99%.

We have found that organic acids, such as oxalic acid, adsorbed on the catalyst do not survive the calcination step. They are decomposed to carbon dioxide and water, and this is desirable if catalyst regeneration is to be practiced in a garage or other place where calcination products are not readily trapped.

Scanning electron microprobe analyses of catalyst samples before and after regeneration by our practice show marked differences in their phosphorus profiles. The as-received catalyst displays a sharp surface profile extending into the pellet some 40 $\mu$m while the regenerated catalyst has a much wider and lower profile extending to the center of the pellet. This suggests that the redistribution of phosphorus away from the pellet edge improves catalyst performance, perhaps by opening blocked catalyst pores or by exposing noble metal which was covered up by the phosphorus-based poison.

Thus we are able to regenerate phosphorus-poisoned automotive exhaust catalysts by treatment with a solution of a suitable acid and subsequent removal of the solution by heating. We have demonstrated the practice with several types and concentrations of acids and treatment temperatures. Any suitable solvent can be used although water is preferred as the least expensive and easiest to handle. If an inexpensive mineral acid can be tolerated, it is preferred to use hydrochloric acid or nitric acid. If the regeneration is to be carried out in a place where dispersion of mineral acid into the environment is unsuitable, one may use a dibasic organic acid such as oxalic acid or malonic acid. Heating of these materials in an oxygen-containing bath decomposes them to carbon dioxide and water.

If a mineral acid is employed, it is preferred to use either hydrochloric acid or nitric acid. If a different mineral acid is employed, care normally must be taken in the way it is used. For example, sulfuric acid may dissolve or degrade the alumina carrier if the solution is too concentrated or hot. Use of phosphoric acid or boric acid typically requires several washes with water to remove the phosphate or borate residue introduced by the treatment. Other chlorine-containing mineral acids, such as perchloric acid, are suitable but more expensive than hydrochloric acid.

While our invention has been described in terms of preferred embodiments, it is apparent that other forms could be adapted by one skilled in the art. Accordingly, the scope of our invention is to be considered limited only by the following claims.

The embodiments of the invention in which an exclusive property or privilege is claimed are defined as follows:

1. A method of restoring the activity of an automotive exhaust gas treatment catalyst containing one or more noble metals dispersed on a high surface area carrier where said catalyst has been poisoned by the presence of phosphorus on the surface of the catalyst, said method comprising the sequential steps of;

contacting the catalyst with an aqueous solution of a dibasic organic acid, the amount of solution being at least sufficient to wet and fill the pores of the catalyst, and thereafter heating the acid wet catalyst in air or in oxygen-containing automotive exhaust gas to remove water and acid.

2. A method of restoring the activity of an automotive exhaust gas treatment catalyst containing one or more noble metals dispersed on a high surface area carrier where said catalyst has been poisoned by the presence of phosphorus on the surface of the catalyst, said method comprising the sequential steps of;

contacting the catalyst with an aqueous solution of an acid selected from the group consisting of oxalic acid and malonic acid, the amount of solution being at least sufficient to wet and fill the pores of the catalyst, and thereafter heating the acid wet catalyst in air or in oxygen-containing automotive exhaust gas to remove water and acid.

3. A method of restoring the activity of an automotive exhaust gas treatment catalyst containing one or more noble metals dispersed on a high surface area carrier where said catalyst has been poisoned by the presence of phosphorus on the surface of the catalyst, said method comprising the sequential steps of;

washing the catalyst at least once in a hot, approximately one molar aqueous solution of an acid selected from the group consisting of oxalic acid and malonic acid, draining off the acid solution, and thereafter heating the acid wet catalyst in air or in oxygen-containing automotive exhaust gas to remove water and the acid.

4. A method of restoring the activity of an automotive exhaust gas treatment catalyst containing one or more noble metals dispersed on a high surface area carrier where the catalyst has been poisoned by the presence of phosphorus on its surface, said method comprising the sequential steps of;

soaking the catalyst with an approximately one molar aqueous solution of an acid selected from the group consisting of oxalic acid and malonic acid, the amount of solution being just sufficient to wet and fill the pores of the catalyst, and thereafter heating the acid wet catalyst in flowing air or oxygen-containing automotive exhaust gas whereby the catalyst is dried, the acid is decomposed and removed and phosphorus is redistributed from the surface of the catalyst and the activity of the catalyst to oxidize hydrocarbons and carbon monoxide is increased.

* * * * *